United States Patent [19]
Quartararo, Jr.

[11] Patent Number: 5,785,181
[45] Date of Patent: Jul. 28, 1998

[54] PERMANENT RFID GARMENT TRACKING SYSTEM

[75] Inventor: Peter J. Quartararo, Jr., Boynton Beach, Fla.

[73] Assignee: Clothestrak, Inc., Margate, Fla.

[21] Appl. No.: 556,798

[22] Filed: Nov. 2, 1995

[51] Int. Cl.$^6$ ............................................. B07C 5/02
[52] U.S. Cl. .................................. 209/3.3; 209/576
[58] Field of Search ................... 209/3.3, 576, 3.1; 235/449, 439

[56] References Cited

U.S. PATENT DOCUMENTS

| | | | |
|---|---|---|---|
| 3,849,633 | 11/1974 | Reitboeck et al. | 209/3.3 X |
| 4,605,847 | 8/1986 | Schittko et al. | 235/471 |
| 4,859,839 | 8/1989 | Tetelman et al. | 235/385 |
| 4,993,245 | 2/1991 | Ott | 70/57.1 |
| 5,016,368 | 5/1991 | Cassata | 40/299 |
| 5,103,737 | 4/1992 | Iwase | 104/88 |
| 5,114,187 | 5/1992 | Branch | 283/81 |
| 5,151,684 | 9/1992 | Johnsen | 340/572 |
| 5,280,159 | 1/1994 | Schultz et al. | 231/382 |
| 5,299,134 | 3/1994 | Speckhart et al. | 364/478 |
| 5,313,393 | 5/1994 | Varley et al. | 364/403 |
| 5,344,269 | 9/1994 | Banks | 414/273 |
| 5,347,263 | 9/1994 | Carroll et al. | 340/572 |
| 5,410,138 | 4/1995 | Martin | 235/449 |
| 5,419,439 | 5/1995 | Branch | 209/3.3 |
| 5,441,158 | 8/1995 | Skinner | 209/937 X |

OTHER PUBLICATIONS

"A Short Course in RF/ID Technologies", by Don Black, *ID Systems Magazine*, Feb. 1994, pp. 52 and 55.
*Radio Frequency Identification (RFID)*. Pamphlet. Boulder CO: ID Technologies, Inc., 1995.
*Passive Transponder System*. Vender fax transmission to inventor. Santa Barbara, CA: E.I.D., Nov. 30, 1992.

Primary Examiner—David H. Bollinger
Attorney, Agent, or Firm—John C. Smith

[57] ABSTRACT

A permanently attached identification device which is a button sized RFID tag having a unique number. The RFID tag is applied to the garment on the first visit and the identification number is then read. Information related to the garment (such as owner name, dates, reason for cleaning, etc.) is input to a computer along with the identification number. Each time the garment is deposited with a dry cleaner the RFID tag is automatically read by a tag reader near the garment conveyor, and information related to the current visit is input to the computer. The computer maintains a history record related to each garment that is keyed to the identification number in the RFID tag.

25 Claims, 8 Drawing Sheets

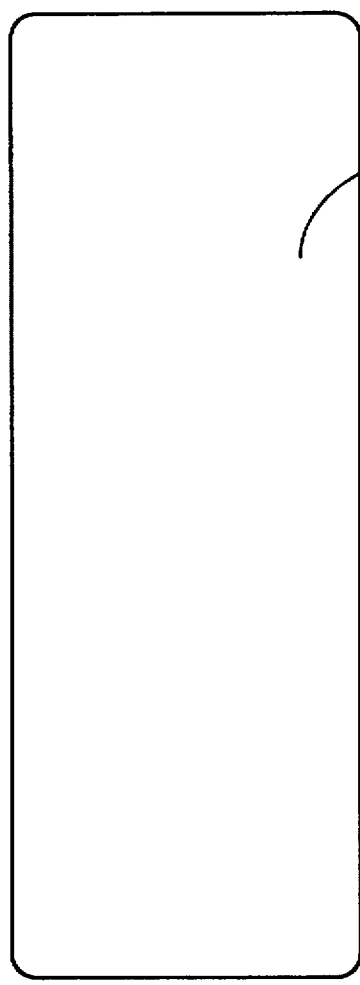
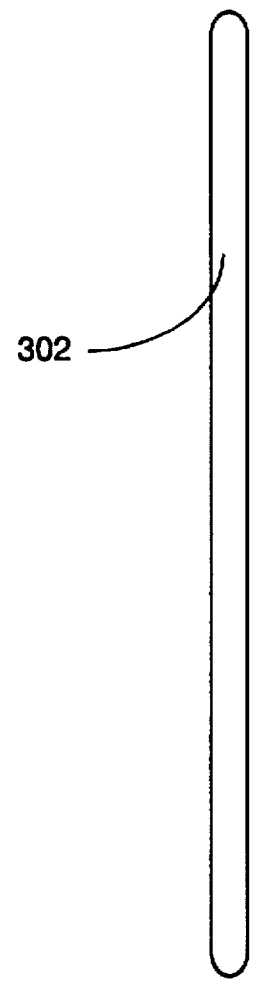
Figure 3A
Figure 3B

PERMANENT RFID GARMENT TRACKING SYSTEM

BACKGROUND OF THE INVENTION

1. Technical Field

The present invention relates to item tracking systems. In particular, it relates to garment tracking systems which allow a system to automatically identify and track a garment over its life.

2. Background Art

Historically, dry cleaning establishments have tagged garments with paper tags which were stapled to the garment when the garment was deposited with the dry cleaners by the customer. An obvious disadvantage of this type of garment identification is the physical damage done to the garment when the tag is attached. After numerous visits to the dry cleaners, the damage done by the tagging may accelerate deterioration of the garment.

In addition, the process of attaching a new garment tag each time the garment is deposited with a dry cleaner adds to the cost. The tag itself has a certain value, and in addition, the labor involved with attaching the tag is costly. After the garment is cleaned, the tag is typically removed and discarded. The next time a customer returns to the dry cleaners with the garment, the process is repeated. As a result, each garment may have to go through this process many times over the course of its life.

Another problem associated with single use tags is that they may deteriorate when washed and be unreadable, or they may accidentally detach from the garment. In either case, the garment may not be easily traced to its owner.

Since the single use tags of the prior art are removed after every use, the dry cleaning establishment does not have any history record of the garment. A history record of the garment is not available. As a result, the dry cleaner does not have information related to the garment which may be useful for a variety of purposes. For example, there may be a claim that the garment is stained or damaged. If the dry cleaner has a history record related to the garment, then the history record may reveal that the damage or stain was pre-existing. This may be particularly valuable in situations where a large number of garments are damaged as would be the case in a fire. The availability of records in this situation may expedite insurance claims. Another use for the history record is that it allows the dry cleaner to track repeat customers so that incentives may be offered such as a free cleaning after a certain number of visits, etc.

The prior art has failed to provide a method of permanently identifying a garment so that its owner would be known, so that the tagging process would not have to be repeated each time the garment was deposited with a dry cleaners, and so that a history record could be made for the purpose of claim reductions and promotional usage.

SUMMARY OF THE INVENTION

The present invention solves the foregoing problems by providing a permanently attached identification device. The identification device is a button sized RFID tag having a unique number. The RFID tag is applied to the garment on the first visit and the identification number is then read. Information related to the garment (such as owner name, dates, reason for cleaning, etc.) is input to a computer along with the identification number. Each time the garment is deposited with a dry cleaner the RFID tag is automatically read by a tag reader, and information related to the current visit is input to the computer.

BRIEF DESCRIPTION OF THE DRAWINGS

FIG. 3A is a front view of a preferred embodiment of a stationary reader.

FIG. 3B is a side view of a preferred embodiment of a stationary reader.

DESCRIPTION OF THE PREFERRED EMBODIMENT

Prior to a discussion of the figures, a general discussion of the system follows. This invention provides a convenient method of tracking garments 202 over the life of a garment 202. The dry cleaner can have information related to a particular garment 202 which will indicate cleaning history, problems, ownership, etc. The permanent tag 102 used to identify the garment 202 reduces expenses associated with tagging garments which exists in prior art systems. In addition, the dry cleaner can use the information in a variety of ways. For example, the total business generated by a single customer with multiple garments 202 can be totaled to calculate total customer business. This allows promotional activities such as volume discounts or so-called "frequent flyer" programs.

The preferred embodiment of the system uses Radio Frequency Identification (RFID). RFID is well known in the art. An advantage of RFID is it uses proximity rather than line of sight as is done in other systems such as bar coding. This reduces errors and allows items such as garments to be identified without physical orientation of the garment being a critical factor.

The tag 102 used contains a microchip which stores a unique number (up to a trillion unique numbers in the preferred embodiment). This eliminates the possibility of duplicate records in a particular dry cleaning establishment.

The system reduces costs in several ways:

1. It is no longer necessary to ticket a garment every time it is cleaned.
2. The costs of the tickets is eliminated.
3. The cost of the pins, staples or nylon straps to attach the tickets is eliminated.
4. Time to process orders is reduced.
5. The number of lost garments is reduced.

6. Claims due to customer misrepresentation are reduced.
7. Cost due to lost or non-recorded charges are reduced.
8. More efficient use of employee time and potential self service operation is possible.
9. Computerizing control of order processing, work and billing is available.
10. Exact pricing can be established for a particular garment.
11. Employee theft can be reduced or eliminated.

Order processing can consume as much as 15 percent of the cost of dry cleaning. Therefore, a more efficient order processing system, such as that disclosed herein, can significantly effect bottom line profits of a dry cleaning establishment. A detailed discussion of the figures follows.

Figure 1A:
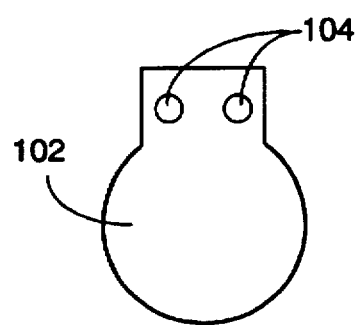
FIG. 1A is a front view of the identification device of the preferred embodiment.

Referring to FIG. 1A, this figure illustrates an identification device 102 as used in the preferred embodiment. The identification device is an RFID tag (for convenience, hereinafter referred to as tag 102). RFID tags are well known in the art and commercially available from companies such as Motorola Corporation, located in San Jose, Calif. RFID tags are attached to a variety of items, such as retail store inventory, for tracking and anti-theft purposes. RFID tags may also be used to track individuals, such as when they are used on employee badges.

Tags 102 may be either passive or active. Active RFID tags provide a greater usable distance between the tag 102 and the reader 302 (discussed more fully below in regard to FIG. 3), typically up to nine feet. Their drawback is that they require an integral power source which limits their useful life span and increases their cost. Passive RFID tags are less expensive and do not have self contained batteries which limit life span. However, their range is more limited and typically they must be in the range of twenty six inches or less. In the preferred embodiment, tag 102 is a passive RFID tag since the drawback associated with distance is not a critical factor and also due to the fact that garments may be used for extended periods of time which may require tag 102 replacement if the battery fails.

Those skilled in the art will recognize that other types of tags may be used, such as bar codes. However, technologies such as bar codes require line of sight which is inconvenient when handling flexible and odd shaped items such as garments.

Those skilled in the art will recognize that while the invention disclosed herein is well suited for use by the dry cleaning industry, there are a variety of industries, such as retail sales, which can implement and benefit from this system. Likewise, the system disclosed herein can be used to track any number of items, other than garments, which would benefit from the available of quick identification and the availability of a history record.

Attachment holes 104 allow tag 102 to be attached to a garment 202 (shown in FIG. 2) in the same manner as a button. Tag 102 can also be attached to a garment via adhesive and attachment holes 104 can be eliminated. Likewise, tag 102 can be enclosed within a garment 202 by sewing the tag 102 within a sealed compartment within the garment 202. An advantage associated with this last method is that tag 102 can be used as an anti-theft device if tag 102 is attached to the garment during manufacture.

Figure 1B:
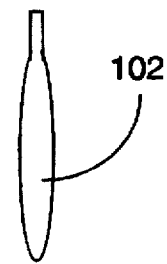
FIG. 1B is a side view of the identification device of the preferred embodiment.

FIG. 1B is a side view of tag 102.

Figure 1C:
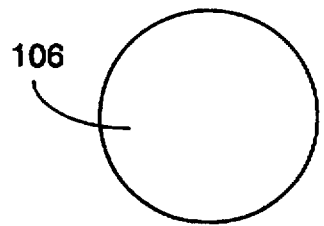
FIG. 1C is a diagram showing an alternative embodiment of the identification device.

FIG. 1C is a front view of illustrating an alternative embodiment in which a hole-less tag 106 is used. Hole-less tag 106 is useful for attachment via adhesive or for enclosure within a compartment of the item or garment 202.

Figure 1D:
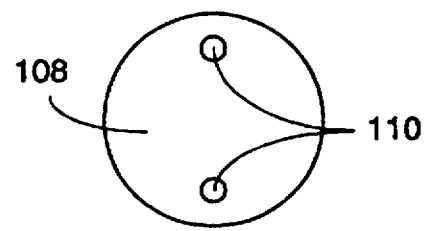
FIG. 1D is a diagram showing another alternative embodiment of the identification device.

FIG. 1D shows another embodiment in which button tag 108 is used. Button tag 108 can be made to look like the other buttons on the garment and attached via holes 110.

Tags 102, 106, 108 can also be used to monitor the movement of individuals in a facility providing readers 302 (shown in FIG. 3) are placed in proper locations.

Figure 2:
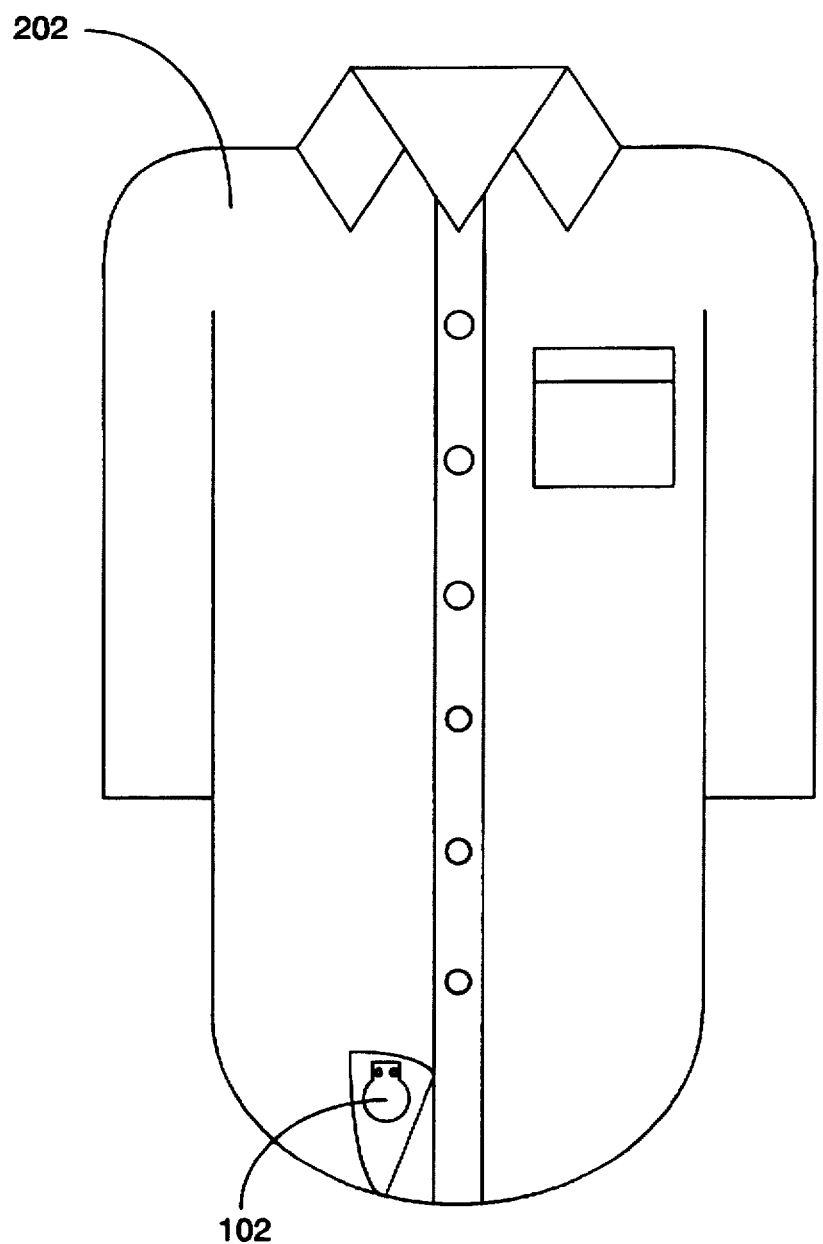
FIG. 2 illustrates the identification device attached to garment.

In FIG. 2, tag 102 is shown attached to a garment 202. Tag 102 can be attached to garment 202 at any convenient location. For ease of illustration, the garment is shown as a shirt with the tail folded back to reveal the location of tag 102. However, those skilled in the art will recognize that any type of garment can be used and tag 102 can be attached at any convenient location.

FIG. 3A shows a front view of a stationary RFID reader 302 (hereinafter reader 302). Reader 302 can be configured in any suitable shape which does not interfere with access to the garments 202. RFID readers are well known in the art and are commercially available from manufacturers of RFID tags, such as Motorola Corporation.

FIG. 3B is a side view of reader 302. For ease of illustration, the stand used to hold reader 302 in position is omitted. Likewise, the cable connection attaching reader 302 to the computer 802 is also omitted.

Figure 4:
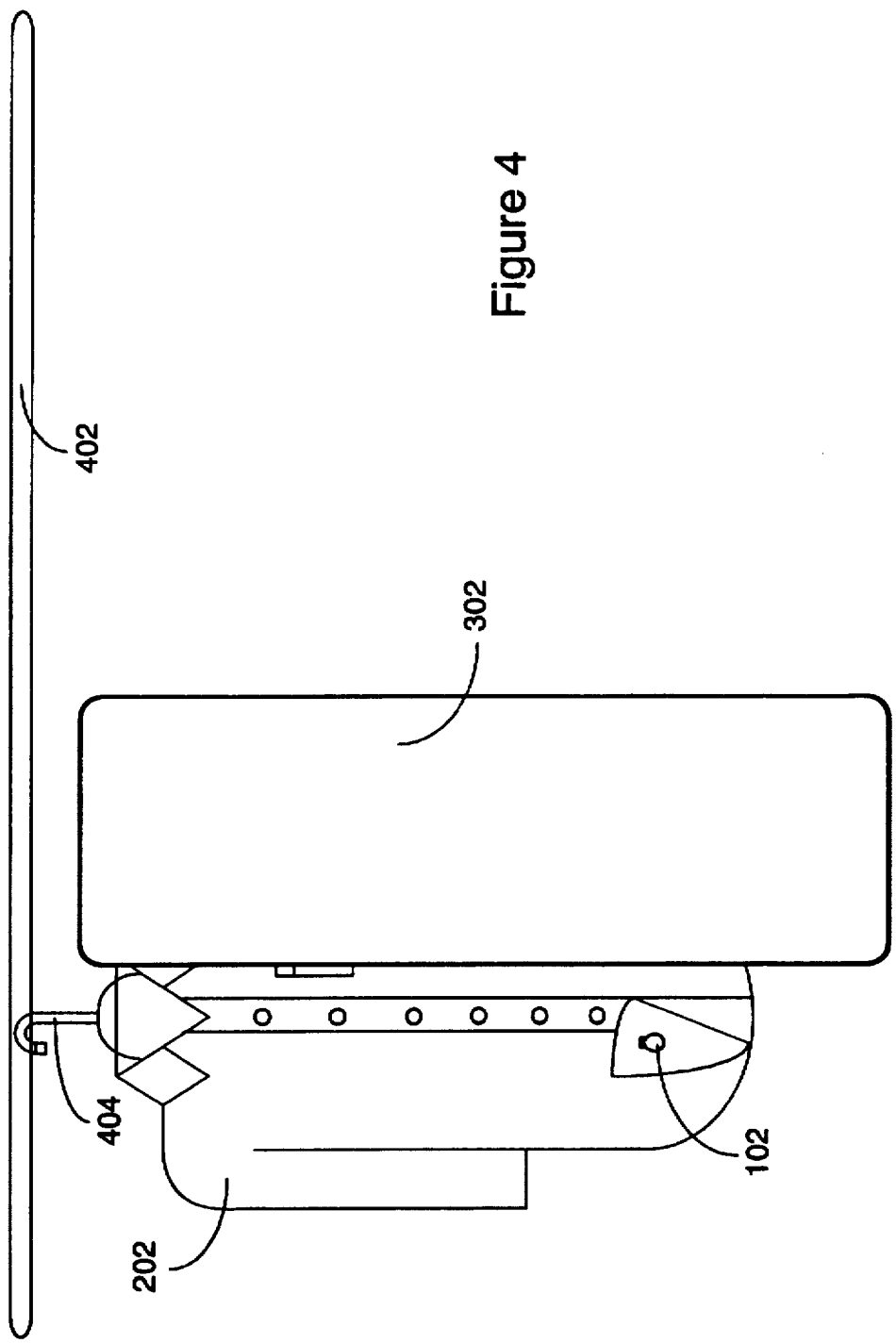
FIG. 4 is a side view of a preferred embodiment of a garment on a garment conveyor moving past a stationary reader.

FIG. 4 shows garment 202 suspended from a garment conveyor 402 by hanger 404. Reader 302 is positioned adjacent conveyor 402. Conveyor 402 moves garment 202 in a path which takes tag 102 past reader 302. Conveyor 302 allows the garment 202 to be located and retrieved when it is ready for pickup by the customer. Likewise, reader 302 can be positioned near the point of deposit by the customer such that the garment's record can be selected by the computer as soon as the customer delivers the garment.

The conveyor 402 is an optional feature which can be used when convenient for the dry cleaner. However, reader 302 does not require conveyor 402 and can be placed at any suitable location, such as the customer service counter. In fact, reader 302 can even be built into the customer service counter such that tag 102 is read when the garment is placed on the customer service counter.

Figure 5:
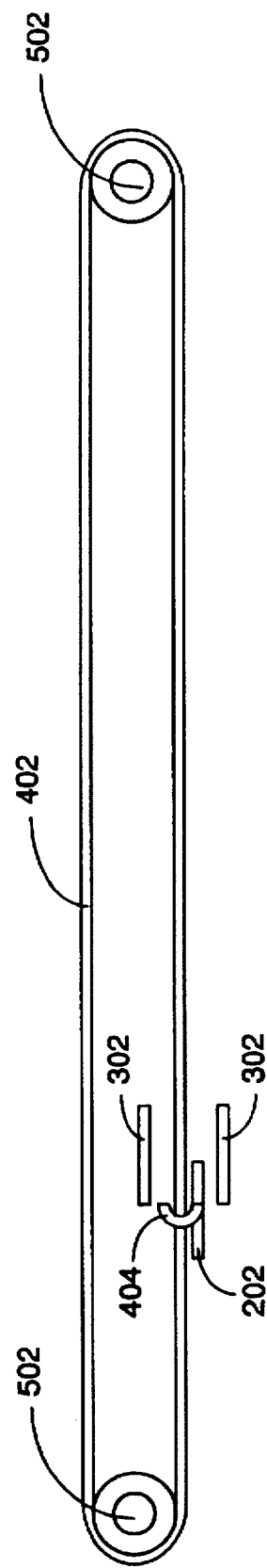
FIG. 5 is a top view of the embodiment of FIG. 4 showing the positioning of stationary readers on either side of a garment on a garment conveyor.

FIG. 5 is a top view of the embodiment of FIG. 4. This figure shows readers 302 positioned on opposite sides of conveyor 402 path. Drive wheels 502, which move the conveyor 402 are shown at either end of conveyor 402. The use of dual readers allows tag 102 to be easily read no matter how the garment 202 is hung on conveyor 402.

Figure 6:
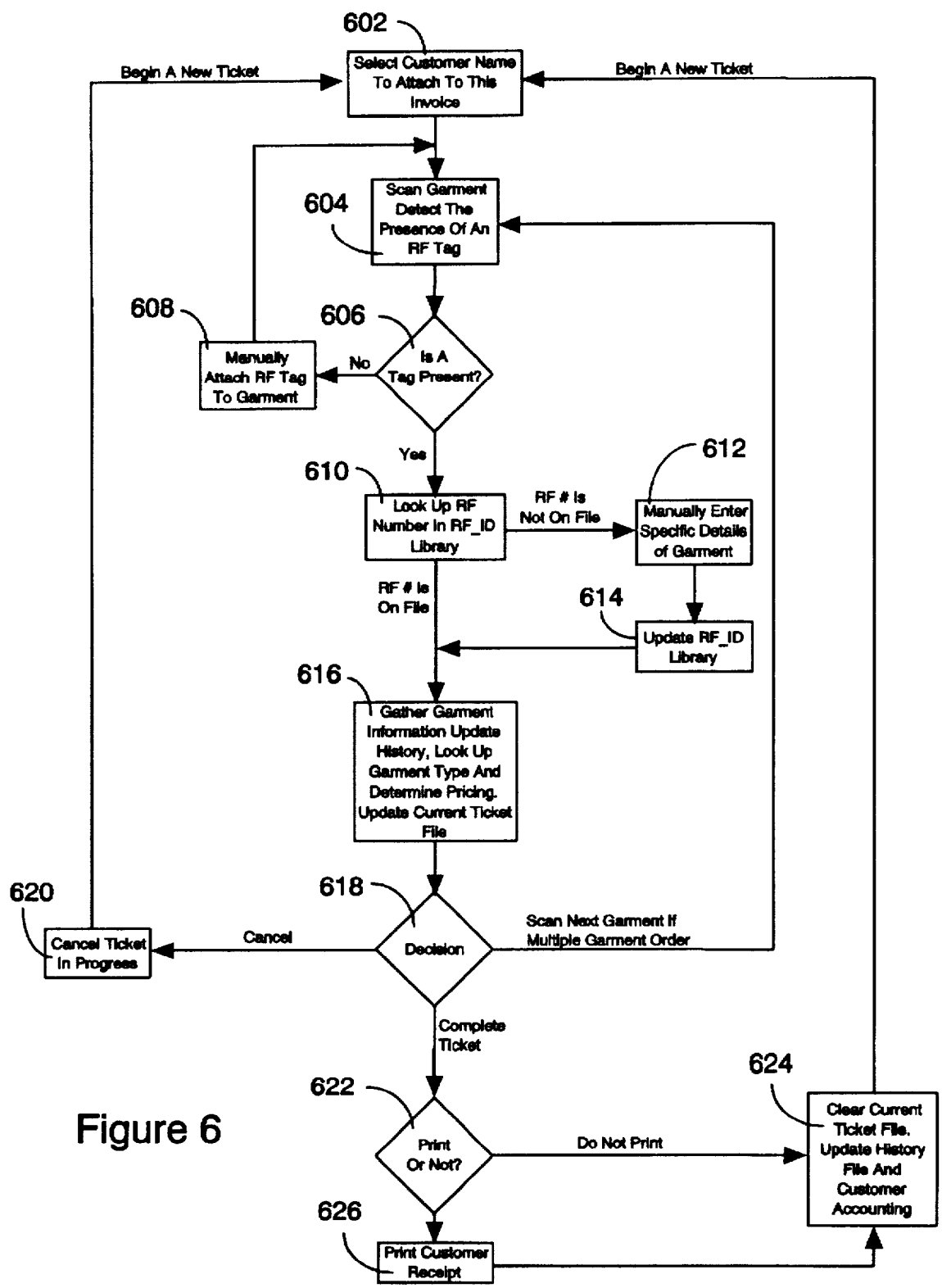
FIG. 6 is a flowchart illustrating the operation of the garment tracking system of the preferred embodiment.

FIG. 6 is a flowchart illustrating how the tracking system would be used in the preferred embodiment. When a customer brings a garment to the dry cleaners for the first time, customer information is obtained 602 to input into the computer 802 (shown in FIG. 8) for use with the invoice, etc. The garment is scanned 604 to determine if a tag 102 is present 606. If not, the computer notifies the dry cleaner who attaches a permanent tag 102 to the garment. The tag 102 is then read.

Once the tag is read, the computer 802 searches its database to determine if the identification number associated with tag 102 is present 610. If the identification number is not on file, the dry cleaner will enter the specific details of the garment 612, the garment identification library will be updated 614.

The computer 802 will then update the garment history file, determine pricing and update the current ticket file 616. If pricing and desired services are not acceptable 618, the ticket will be canceled and the system will wait for the next garment 620. On the other hand, if the customer is satisfied with the price and other service features, such as delivery time, etc, the transaction ticket will be completed 618.

If the garment 202 is being delivered to the dry cleaners, a ticket will be printed for the customer 622, 624. If the customer is picking up a garment 202, then a ticket will not be needed 622. At this point, the records related to this garment are updated and the system waits for the next garment 624.

In the event the garment has had a tag 102 attached during manufacture or the garment has had a tag 102 attached by another dry cleaners, reader 302 will detect a tag 102 but will have no record of the garment 202. In this situation the garment will be treated as though the tag 102 was just attached by the dry cleaner. This is possible since each tag 102 has a unique identification number.

Those skilled in the art will recognize that while the preferred embodiment envisions a system which is controlled by the dry cleaner's employees, it would be easy to design an automated system which would allow the customer to perform these activities on a self service basis. The only additional requirement would be a limited function terminal which would allow the customer to input instruction related to the nature of services desired, etc.

Figure 7:
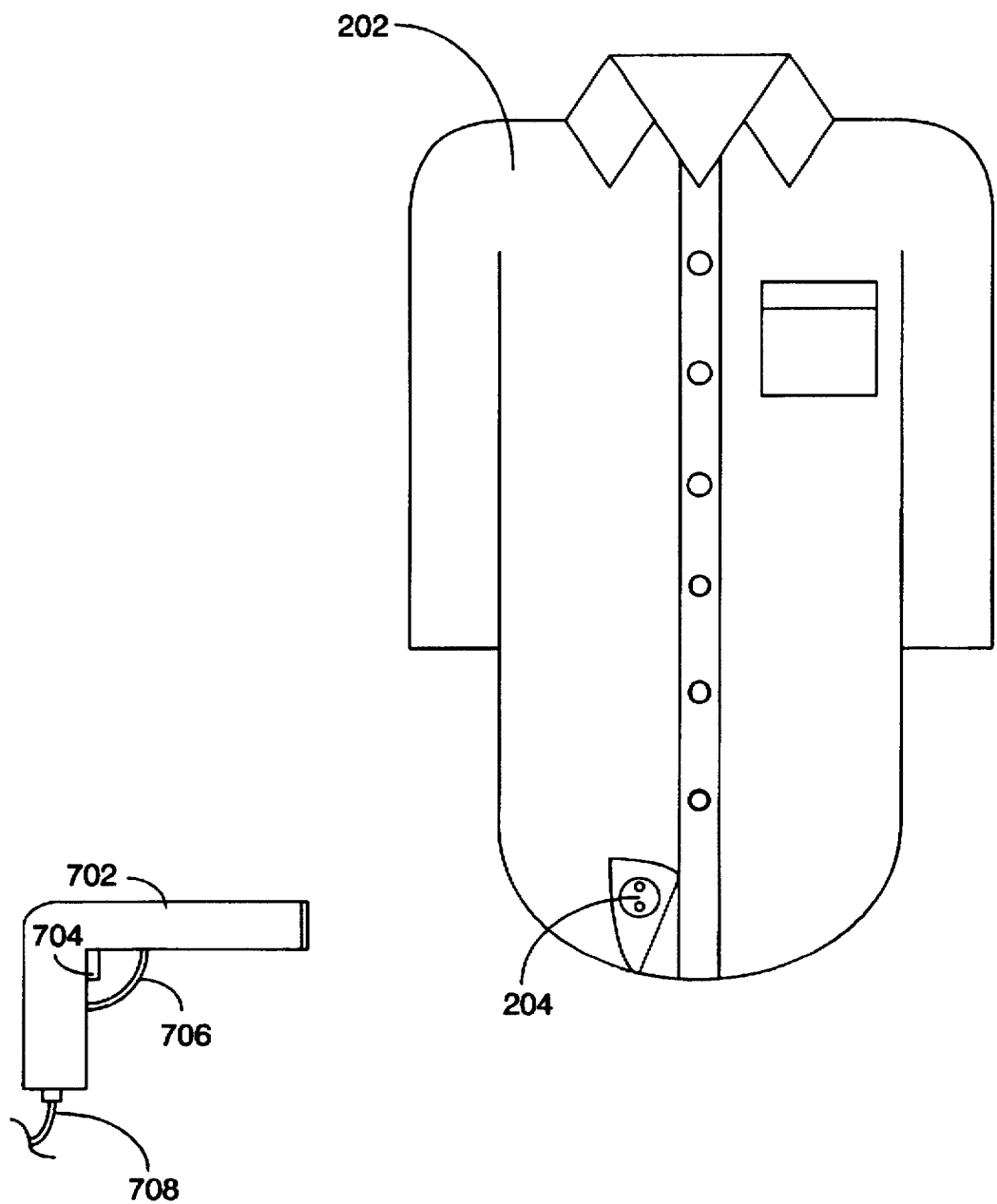
FIG. 7 is illustrates an alternative embodiment which uses a portable hand held reader.

FIG. 7 illustrates an alternative embodiment RFID reader 702. Reader 702 is a portable hand held reader with a trigger actuator 704. Optional trigger guard 704 is used to prevent inadvertent actuation. Also, cord 708 is attached to computer 802. However, reader 702 can be equipped with an optional transmitter which would allow cordless communication with a receiver (not shown) attached to computer 802. Reader 702 can be used as an alternative to, or in conjunction with, stationary reader 302 depending on the physical layout or operational procedures desired in a particular dry cleaning establishment.

Figure 8:
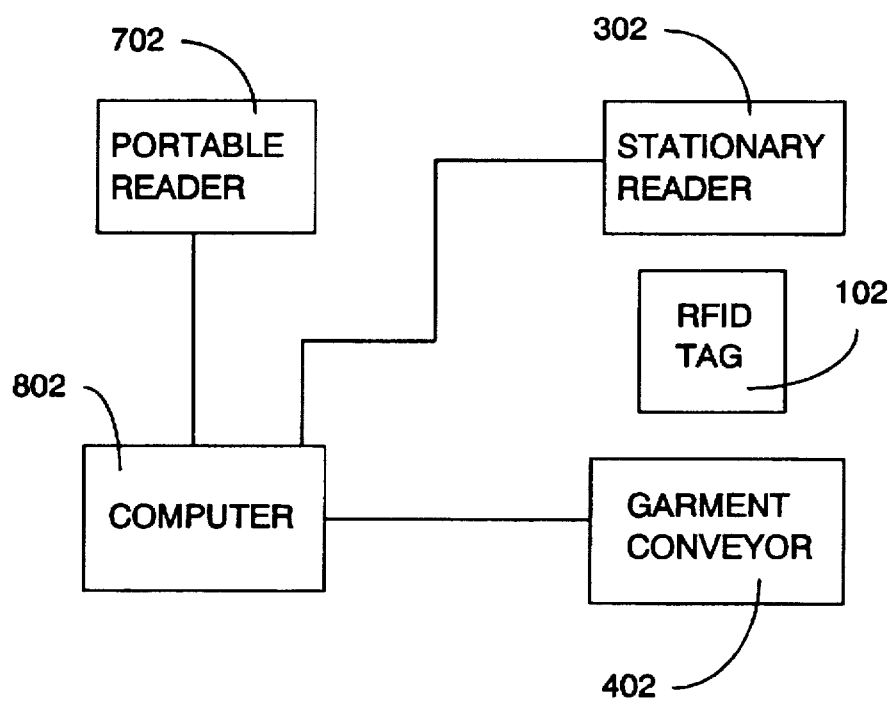
FIG. 8 is a diagram of the system showing the interconnection of the computer with a garment conveyor, a portable reader and a stationary reader.

FIG. 8 is a diagram of the entire system. Computer 802 accepts information input from stationary reader 302 and portable reader 702. Garment conveyor 402 can also be controlled by computer 402. Tag 102 is shown between conveyor 402 and stationary reader 302 for ease of illustration. In practice tag 102 is attached to a garment 202 and can be hung from garment conveyor 402, or held at the dry cleaner's counter (not shown) and read by a portable reader 702 or a stationary reader 302.

While the invention has been described with respect to a preferred embodiment thereof, it will be understood by those skilled in the art that various changes in detail may be made therein without departing from the spirit, scope, and teaching of the invention. For example, tag type can vary, the manner of attachment can vary, the type and location of readers used can vary, etc. Accordingly, the invention herein disclosed is to be limited only as specified in the following claims.

I claim:

1. An item tracking system for tracking the activity history of an item, comprising:

an identification device having storage for holding information related to an item, the identification device further having means to permanently attach itself to an item for the life of the item;

a reader capable of reading the information stored in the identification device, the reader further having an output for outputting information read from the identification device; and a computer having an input attached to the reader such that information read from the identification device by the reader can be transferred from the reader to the computer, the computer further having storage to maintain a history record of the item which includes records of actions taken in regard to the item over the lifespan of the item;

whereby the computer can track actions taken in regard to the item attached to the identification device and maintain a history record of the item describing activities taken over the lifespan of the item.

2. A system, as in claim 1, wherein:

the identification device is an RFID tag; and the reader is an RFID reader.

3. A system, as in claim 2, further comprising:

a garment conveyor;

the item the identification device is attached to is a garment; and the reader is positioned in sufficient proximity to the garment conveyor such that the identification device can be read when the garment is moved past the reader on the conveyor.

4. A system, as in claim 3, wherein:

the identification device is encapsulated such that it can be cleaned with the garment and further has a button shape to permit attachment to the garment via sewing;

the computer storage further comprises a garment history and;

updating the garment history each time an action is taken to include information about the action:

whereby a history record is created that describes activities taken in regard to a garment that occurred over the lifespan of the garment.

5. A system, as in claim 3, wherein:

the identification device is encapsulated such that it can be cleaned with the garment and further is attached to the garment via adhesive;

the computer storage further comprises a garment history and;

updating the garment history each time an action is taken to include information about the action;

whereby a history record is created that describes activities taken in regard to a garment that occurred over the lifespan of the garment.

6. A system, as in claim 3, wherein:

the identification device is encapsulated such that it can be cleaned with the garment and further is attached to the garment by enclosing the it within a compartment of the garment;

the computer storage further comprises a garment history and;

updating the garment history each time an action is taken to include information about the action;

whereby a history record is created that describes activities taken in regard to a garment that occurred over the lifespan of the garment.

7. A system, as in claim 2, further comprising:

the item the identification device is attached to is a garment; and the reader is a portable hand held reader.

8. A system, as in claim 7, wherein:

the identification device is encapsulated such that it can be cleaned with the garment and further has a button shape to permit attachment to the garment via sewing; and the computer storage further comprises a garment history which is updated each time an action is taken for the garment, whereby the history record contains information describing the actions taken in regard to the garment.

9. A system, as in claim 7, wherein:

the identification device is encapsulated such that it can be cleaned with the garment and further is attached to the garment via adhesive;

the computer storage further comprises a garment history and;

updating the garment history each time an action is taken to include information about the action;

whereby a history record is created that describes activities taken in regard to a garment that occurred over the lifespan of the garment.

10. A system, as in claim 7, wherein:

the identification device is encapsulated such that it can be cleaned with the garment and further is attached to the garment by enclosing the it within a compartment of the garment;

the computer storage further comprises a garment history and;

updating the garment history each time an action is taken to include information about the action;

whereby a history record is created that describes activities taken in regard to a garment that occurred over the lifespan of the garment.

11. A method of tracking item usage over the lifespan of an item, including the steps of:

attaching a permanent identification device having storage for holding information related to an item;

reading the information stored in the identification device with a reader, and outputting information read from the identification device;

inputting identification device information from the reader into a computer;

maintaining a history record of activity related to the item in a computer; and updating the history record to record new activity related to the item such that the history record contains a history of actions taken in regard to the item over the lifespan of the item;

whereby a record of actions taken in regard to the item over its lifespan is maintained.

12. A method, as in claim 11, including the further steps of:

using an RFID tag as the identification device; and using an RFID reader as the reader.

13. A method, as in claim 12, including the further steps of:

using a garment as the item the identification device is attached to;

transporting the garments past the reader on a garment conveyor; and locating the reader in sufficient proximity to the garment conveyor such that the identification device can be read when the garment is moved past the reader on the conveyor.

14. A method, as in claim 13, including the further steps of:

encapsulating the identification device such that it can be cleaned with the garment;

shaping the identification device in the form of a button shape to and attaching it to the garment via sewing;

maintaining a garment history in the computer storage and;

updating the garment history each time an action is taken to include information about the action;

whereby a history record is created that describes activities taken in regard to a garment that occurred over the lifespan of the garment.

15. A method, as in claim 13, including the further steps of:

encapsulating the identification device such that it can be cleaned with the garment;

attaching the identification device to the garment via adhesive;

maintaining a garment history in the computer storage and;

updating the garment history each time an action is taken to include information about the action;

whereby a history record is created that describes activities taken in regard to a garment that occurred over the lifespan of the garment.

16. A method, as in claim 13, including the further steps of: encapsulating the identification device such that it can be cleaned with the garment; and attaching the identification device to the garment by enclosing the it within a compartment of the garment; and maintaining a garment history in the computer storage and;

updating the garment history each time an action is taken to include information about the action;

whereby a history record is created that describes activities taken in regard to a garment that occurred over the lifespan of the garment.

17. A method, as in claim 12, including the further steps of:

using a garment as the item; and using a portable hand held reader as the reader.

18. A method, as in claim 17, including the further steps of:

encapsulating the identification device such that it can be cleaned with the garment;

shaping the identification device in the form of a button shape to permit attachment to the garment via sewing;

maintaining a garment history in the computer storage and;

updating the garment history each time an action is taken to include information about the action;

whereby a history record is created that describes activities taken in regard to a garment that occurred over the lifespan of the garment.

19. A method, as in claim 17, including the further steps of:

encapsulating the identification device such that it can be cleaned with the garment;

attaching the identification device to the garment via adhesive;

maintaining a garment history in the computer storage and;

updating the garment history each time an action is taken to include information about the action;

whereby a history record is created that describes activities taken in regard to a garment that occurred over the lifespan of the garment.

20. A method, as in claim 17, including the further steps of:

encapsulating the identification device such that it can be cleaned with the garment; and attaching the identification device to the garment by enclosing the it within a compartment of the garment;

maintaining a garment history in the computer storage and;

updating the garment history each time an action is taken to include information about the action;

whereby a history record is created that describes activities taken in regard to a garment that occurred over the lifespan of the garment.

21. A method of permanently identifying and tracking garment activity history, including the steps of:

scanning a garment with an RFID reader for the presence of an RFID tag;

determining if the RFID reader has detected that an RFID tag is attached to a garment;

attaching an RFID tag to a garment if an RFID tag is not present;

reading identification information stored in the RFID tag with a reader and outputting the identification information into a computer having a garment records associated with RFID tag information;

determining if there is a garment record stored in the computer related to the RFID tag identification information;

creating a new garment record if a garment record related to the RFID tag identification information does not exist; and updating the garment record related to the RFID tag identification information with information related to activity to be performed on the garment.

22. A method, as in claim 21, including the further step of printing a customer ticket when the garment record has been updated.

23. A method, as in claim 21, including the further steps of:

determining if more than one garment is to be processed as a single order;

updating the garment record for each garment to be processed in the single order;

maintaining a garment history in the computer which is updated each time an action is taken for the garment; and printing a customer ticket when all of the garment records for garments in the single order have been updated.

24. A method, as in claim 23, including the further steps of:

shaping the RFID tag in the form of a button; and sewing the RFID tag directly to the garment.

25. A method, as in claim 24, including the further step of using a portable hand held reader to scan the RFID tag.

\* \* \* \* \*